US008641799B2

(12) United States Patent
Boehm et al.

(10) Patent No.: US 8,641,799 B2
(45) Date of Patent: Feb. 4, 2014

(54) PROCESS FOR PRODUCING AGGLOMERATES OF FINELY PARTICULATE IRON CARRIERS

(75) Inventors: Christian Boehm, Thalheim (AT); Hado Heckmann, Linz (AT); Hans Herbert Stiasny, Linz (AT); Johannes Leopold Schenk, Linz (AT)

(73) Assignee: Siemens Vai Metals Technologies GmbH (AT)

( * ) Notice: Subject to any disclaimer, the term of this patent is extended or adjusted under 35 U.S.C. 154(b) by 248 days.

(21) Appl. No.: 13/063,344

(22) PCT Filed: Aug. 17, 2009

(86) PCT No.: PCT/EP2009/060609
§ 371 (c)(1),
(2), (4) Date: Apr. 5, 2011

(87) PCT Pub. No.: WO2010/028932
PCT Pub. Date: Mar. 18, 2010

(65) Prior Publication Data
US 2011/0179910 A1    Jul. 28, 2011

(30) Foreign Application Priority Data
Sep. 11, 2008 (AT) .................................. A 1419/2008

(51) Int. Cl.
*C21B 13/08* (2006.01)
*C22B 1/14* (2006.01)
*C22B 1/242* (2006.01)

(52) U.S. Cl.
USPC ................................. 75/499; 75/500; 75/770

(58) Field of Classification Search
USPC .......................................... 75/770, 505, 499
See application file for complete search history.

(56) References Cited

U.S. PATENT DOCUMENTS

| 3,975,182 A | 8/1976 | Goetzman |
| 4,441,616 A * | 4/1984 | Konig et al. ................. 209/44.1 |
| 4,701,214 A | 10/1987 | Kaneko et al. |
| 4,995,904 A * | 2/1991 | Hauk .............................. 75/445 |
| 6,214,087 B1 * | 4/2001 | Hoffman et al. ................ 75/500 |

FOREIGN PATENT DOCUMENTS

| CN | 101 070 558 A | 11/2007 |
| CN | 101260448 A | 9/2008 |
| DE | 2438408 A1 | 2/1975 |
| GB | 1364150 A | 8/1974 |

(Continued)

OTHER PUBLICATIONS

International Search Report dated Jan. 11, 2010, issued in corresponding international application No. PCT/EP2009/060609.

(Continued)

*Primary Examiner* — George Wyszomierski
*Assistant Examiner* — Tima M McGuthry Banks
(74) *Attorney, Agent, or Firm* — Ostrolenk Faber LLP

(57) ABSTRACT

A process for producing agglomerates from fine-grained iron carriers and at least one binder as a charge material for a metallurgical process is shown. In at least one further agglomeration step, the agglomerates are coated with a layer, comprising iron carriers and at least one binder, and heated in such a way that the binder is cured in the region of the surface of the agglomerates. In a process for producing liquid pig iron or liquid primary steel products from charge materials and possibly additions and agglomerates, the agglomerates are preheated in a reducing zone, which has a preheating stage, in such a way that the agglomerates completely harden in the preheating stage.

33 Claims, 1 Drawing Sheet

(56) References Cited

FOREIGN PATENT DOCUMENTS

| | | |
|---|---|---|
| GB | 1374026 A | 11/1974 |
| GB | 1485418 A | 9/1977 |
| JP | 54062913 A | 5/1979 |
| JP | 59173229 A | 10/1984 |
| JP | 03036219 A | 2/1991 |
| KR | 20010089927 A | 10/2001 |
| RU | 2151205 C1 | 6/2000 |
| WO | WO 00/56941 A1 | 9/2000 |
| WO | WO 2005/054520 A1 | 6/2005 |
| WO | WO 2005/103307 A | 11/2005 |
| WO | WO 2007/123512 A1 | 11/2007 |

OTHER PUBLICATIONS

Database WPI Week 200222 Thomson Scientific, London GB; AN 2002-169251 XP002561555 & KR 2001 089 927 A (Korea Kumho Petrochemical Co Ltd) Oct. 17, 2001 abstract.

Chinese Office Action mailed May 29,2013 in corresponding Chinese Patent Application No. 200980135610.X, along with English language translation thereof.

\* cited by examiner

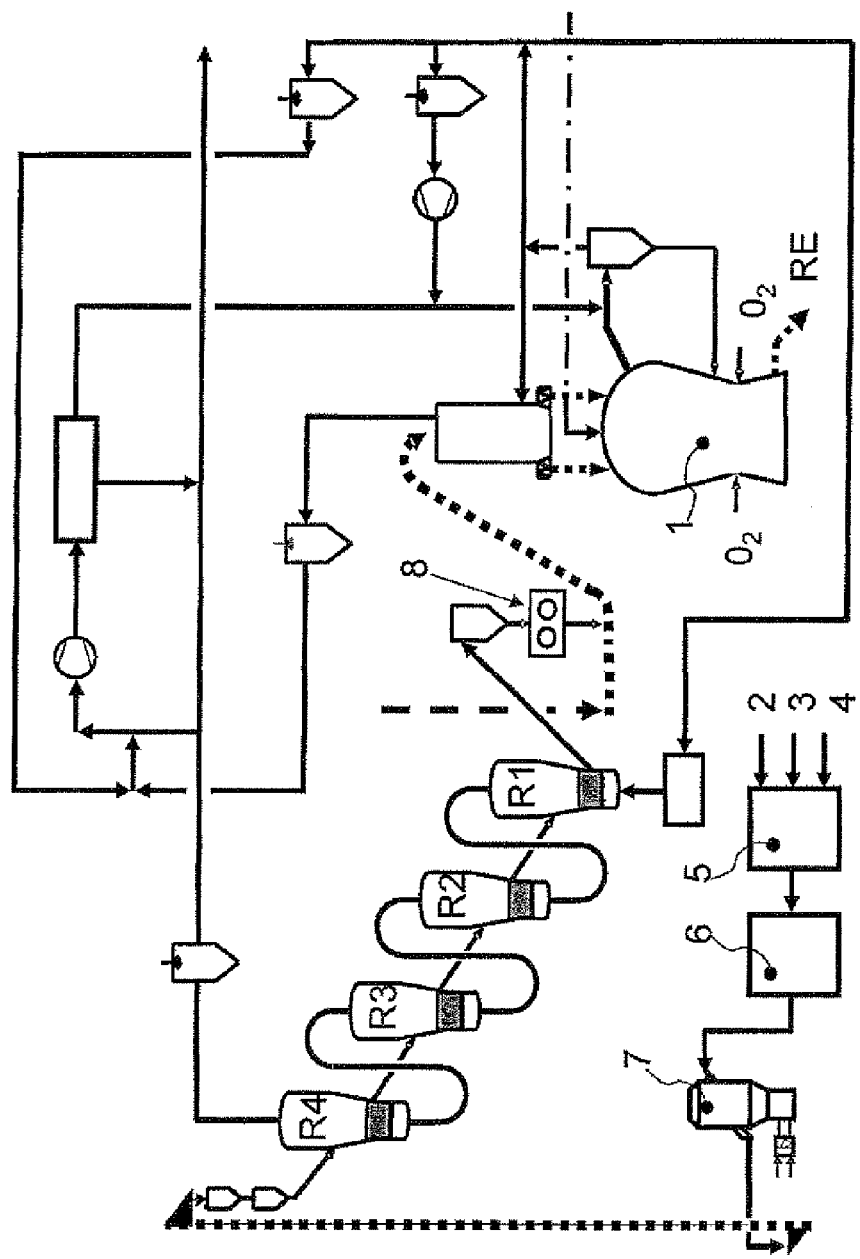

PROCESS FOR PRODUCING AGGLOMERATES OF FINELY PARTICULATE IRON CARRIERS

CROSS-REFERENCE TO RELATED APPLICATIONS

The present application is a 35 U.S.C. §§371 national phase conversion of PCT/EP2009/060609, filed Aug. 19, 2009, which claims priority of Austrian Application No. A1419/2008, filed Sep. 11, 2008, the contents of which are incorporated by reference herein. The PCT International Application was published in the English language.

BACKGROUND OF THE INVENTION

The invention relates to a process for producing agglomerates from fine-grained iron carriers, in particular iron ores and/or iron-containing dusts and/or slurries, and at least one binder as a charge material for a thermal process, in particular a metallurgical process, wherein the iron carriers are mixed with the binder and any additions and agglomerated.

The invention also relates to a process for producing liquid pig iron or liquid primary steel products from charge materials, in particular iron ores, possibly additions and agglomerates, wherein the charge materials are subjected to a substantial reduction in a reducing zone and then fed to a smelting zone or a smelting unit, in particular a melt gasifier, for smelting with the addition of carbon carriers and oxygen-containing gas to form a fixed bed, and a reducing gas is formed and introduced into the reducing zone.

WO 2005/103307A discloses a method for the production of layered iron ore balls. It is suggested to add an internal fuel additive to the outer layer.

JP 3-36219 discloses a method for the production of layered pellets with necessary strength and little powderization. The outer layer has a higher Bentonite ratio compared to the inner layer.

A method for the production of Chromium ore pellets can be derived from JP 54-62913. In order to increase the strength of the pellets it is suggested to coat the pellets with a layer of ferronickel slag powder.

U.S. Pat. No. 4,701,214 A teaches a method for the production of iron from finely divided iron ore. The iron ore fines are agglomerated, prereduced in a rotary hearth furnace and charged into a smelting-reduction vessel together with carbon carriers and oxygen where iron is produced. In the smelting-reduction vessel a CO- and $H_2$-containing reduction gas is formed which is introduced into the rotary hearth furnace for the reduction of the agglomerates.

It is known from the prior art that fine ores are initially reduced in reducing zones and then smelted in a smelting zone to form pig iron. Such processes operate in an operating range which is characterized for example by the grain size of the charge materials. In principle, small grain sizes entail the problem that considerable amounts of dust occur in the process or small particles can be discharged from the process units along with the process gas.

SUMMARY OF THE INVENTION

It is therefore an object of the invention to extend the operating range of a process for producing liquid pig iron to the extent that even extremely fine ores with very small grain sizes can be processed and dust formed during processing of the fines ore can be avoided.

This object is achieved by the process according to the invention.

Even very fine-grained iron carriers, such as for example iron ores and/or iron ore concentrates and/or iron-containing dusts and/or slurries, can be processed by the process according to the invention. This involves preventing or making it more difficult for fractions in the form of fine particles, in particular in the form of dust, to occur in turn as a result of the mechanical loads acting on agglomerates before and during the processing in a reducing unit. These loads are caused by pressure, friction, shearing and impact, usually as a result of an interaction between the agglomerates.

To solve this problem, the fine-grained iron carriers mixed together with the binder are agglomerated and subsequently heated in such a way that the binder is cured in the region of the surface of the agglomerates. The heating can be used for specifically controlling the curing of the binder, and in this way the mechanical properties, in particular the strength at the surface of the agglomerates, can be set. The heating may in this case take place in a treatment device outside a metallurgical process, in particular during a drying operation or immediately following a drying operation, or within the first stage of a metallurgical process.

In the latter case, it is alternatively or additionally possible also to use binders which at low temperatures, in particular ambient temperatures, already develop strength adequate to allow the agglomerates to be introduced into the first stage of a metallurgical process largely undamaged by mechanical loads without additional heating, the hardening that is required for further service requirements taking place by heating in said first stage of the process. The ambient temperature is in this case adequate for curing of the binder.

As a result, it is possible to process the agglomerates in a metallurgical process, such as for example a reducing process or a smelting-reducing process, it being possible for the fraction that is obtained in the form of fine particles to be at least significantly reduced or almost completely avoided. It is particularly advantageous in this respect that the agglomerates do not have to be fully hardened throughout; consequently the heating can be at least curtailed and the energy expenditure considerably reduced. If need be, the agglomerates may, however, also be fully hardened throughout, that is to say not only in the outer region.

According to an advantageous refinement of the process according to the invention, in at least one further agglomeration step, the agglomerates are coated with a layer, comprising iron carriers and at least one binder. The additional layer makes it possible to produce agglomerates which have a different binder fraction or different kind of binder on the outside than in the core or else consist of a different fine-grained iron carrier on the outside than on the inside. This makes it possible for the agglomerates to be adapted for a metallurgical process, in particular allowing account to be taken for multistage metallurgical processes. For example, the additional layer may be chosen such that this layer is converted with preference in a first step of a metallurgical process.

According to a further advantageous refinement of the process according to the invention, after the at least one further agglomeration step, the agglomerates are heated in such a way that the binder of the outermost layer or the outer layers cures. The heating may be controlled in such a way that curing only takes place in a certain outer region of the agglomerates. The cured outer region provides adequate protection for the agglomerates from mechanical loads during the handling prior to feeding into a metallurgical process, and in the first stage of a metallurgical process. In the further course of a metallurgical process, in particular a heating and reducing stage, the core region of the agglomerates also develops its strength. As a result of the transformation of the iron oxides into metallic iron by reduction (metallization) proceeding from the outer zone into the core, the agglomerates assume a maximum strength and are virtually indestructible by normal mechanical loads until a softening temperature is reached.

It is particularly advantageous in this respect that the mechanical properties, but also the composition, in the outer layer or layers can be made to suit the metallurgical process. For instance, it is possible that, in the outer layer of the agglomerates, a composition of the charge materials in the form of fine particles is chosen such that a reduction through to metallization already occurs there during the heating in an atmosphere of oxidizing gases, producing metallic iron or its precursor wustite. As a result, the formation of a stable metallic shell around the still oxidic core of agglomerates is speeded up in comparison with the usual reduction with gases (indirect reduction).

A suitable refinement of the process according to the invention provides that the agglomerates are hardened before the further agglomeration step. Consequently, hardening is also achieved in the core region of the agglomerates, whereby they gain additional strength. Because of the formation of a temperature profile with temperatures increasing from the outside inward, higher hardening temperatures over the outer shell of the agglomerates or longer dwell times in a hardening zone must be accepted in order to achieve a comparable hardness of this agglomerate, in particular its core.

According to a particular refinement of the process according to the invention, the binder of the outermost layer or the outer layers has a lower curing temperature than the binder in the interior of the agglomerates. In this case, it is possible to produce agglomerates which at low temperatures, in particular ambient temperatures, already develop strength in the outermost layer or outer layers adequate to allow the agglomerates to be introduced into the first stage of a metallurgical process largely undamaged by mechanical loads without prior heating, the hardening that is required for further service requirements taking place by heating in said first stage of the process.

This allows the heating of the agglomerates after the agglomeration to be restricted to the hardening of the outermost layer or outer layers, so that the necessary time for the hardening can be cut and the energy expenditure can be reduced. The choice of binder in the core of the agglomerates, on the other hand, is made on the basis of cost aspects or else on the basis of the aspect of reduction resistance, that is to say the resistance of the agglomerates to grain disintegration in a reducing, hot gas atmosphere with simultaneous exposure to mechanical loads under given process conditions.

According to a further advantageous refinement of the process according to the invention, the agglomerates are coated, in particular after the hardening, with a coating of carbon-containing materials, lime, in particular calcined lime, or dusts from the agglomeration. The coating makes it possible to provide process aids directly on the agglomerates, so that for example caking together of agglomerates (sticking) during the reduction process can be prevented. Furthermore, green agglomerates may be coated for example to prevent them from sticking together when they are stored in piles. For this purpose, powdery substances, preferably containing iron and/or carbon, are applied to the agglomerates as an outer covering without wetting or addition of binder in a final agglomeration step.

According to a suitable refinement of the process according to the invention, before the agglomerating operation, the iron carriers and the binder and any additions are kneaded to improve the binding ability. Depending on the binder used, the kneading can be conducive to swelling of the binder, set a consistency of the charge material that is desired for the subsequent agglomeration step or else provide the dwell times that are necessary for chemical reactions occurring in the charge material.

An advantageous refinement of the process according to the invention provides that the iron carriers comprise not only fine-grained iron ores and/or dusts and/or slurries but also granular fractions, in particular recycled agglomerates, with a grain size of 0.1 to 3 mm, in particular 0.5 to 1.5 mm, the granular fractions serving as nucleants for the forming of the agglomerates. In the case where the agglomeration primarily takes the form of granulation or pelletizing, the use of nucleants has the effect of speeding up the forming of the agglomerates and of achieving a more uniform agglomerate size and form. It is advantageous in this respect to use recycled agglomerates or else fragments of recycled agglomerates that occur during the use or processing of the agglomerates. The size of the granular fraction may also be specifically set by crushing, screening and other suitable measures. In particular in the case of agglomeration using pressing (extrusion, compacting, briquetting), it may be advisable not only to mix particles of different sizes but also particles of different forms with one another. For example, by admixing iron scale, which has a flaky form, with fine-grained iron ores or iron-containing slurries, the cold and hot strengths of the agglomerates produced from them are improved.

According to the invention, in particular during or after the agglomeration, the agglomerates are dried, in particular by thermal drying and/or storing in air.

According to a particular refinement of the process according to the invention, however, a mechanical dewatering operation may also take place before or during the agglomeration, in particular mechanical dewatering during a press-forming operation.

The mechanical dewatering allows the drying time and also the preheating period in the metallurgical process to be reduced. The methods of reducing the moisture content may in this case be chosen as required.

According to an advantageous refinement of the process according to the invention, the agglomerates are produced by granulating or pelletizing. The advantages of granulating/pelletizing over compacting/briquetting lie in lower equipment expenditure or equipment wear and lower binder requirement. On the other hand, methods of granulating/pelletizing require a fine grain of the feedstock, so that charge materials possibly first have to be prepared for the actual agglomeration process by grinding.

However, on account of their fine grain size, iron ore concentrates that are obtained for example by means of flotation processes and iron-containing metallurgical dusts and slurries from melt-reducing processes such as Corex® or Finex® may generally be agglomerated without additional grinding effort by granulating/pelletizing. Under some circumstances, however, it may be advantageous to carry out the agglomeration while pressing or compressing the material, in particular by compacting/briquetting, if this compressing is desired for setting increased strengths of the agglomerates and the disadvantage resulting from compressing of reduced reduction kinetics is of less concern.

Processed particularly advantageously by the process according to the invention are dusts and/or slurries that are iron- and/or carbon-containing remains from steel production or finely ground carbon carriers, in particular anthracite, coke or petroleum coke. This makes it possible also to make use of the substances of value that are contained in ultrafine residues, such as dusts or slurries, for a metallurgical process without having to accept disadvantageous effects on the process sequence.

According to the invention, the iron carriers are sintered ore, ore concentrate, undersized material of iron ore, returns or dusts from agglomeration. These substances of value are distinguished by high iron contents, that have so far only been used with disadvantages, such as for example high amounts of dust or dust fractions in the process gas of a metallurgical process, or else converted into a usable form only with high energy expenditure. Returns of an agglomeration are understood as meaning undersized material of the agglomerates, fragments of agglomerates or agglomerates of inadequate strength or form. Dusts occur in the course of agglomeration and associated preparation, in particular in granulating and drying/hardening stages.

A special refinement of the process according to the invention provides that the additions are metallurgical additions, in particular lime and/or dolomite and/or carbon-containing additions for setting at least partially self-reducing agglomerates. Incorporating additions directly in the agglomerates makes it possible to dispense at least partially with separate adding of additions in metallurgical processes.

In a further special refinement of the process according to the invention, carbon-containing dusts, slurries or finely ground carbon carriers are incorporated as additions in the agglomerates, whereby the agglomerates are made to be at least partially self-reducing under the conditions of a metallurgical process. Carbon-containing dusts and slurries from the COREX® and the FINEX® processes are suitable in particular for this purpose.

Additions may also serve the purpose of speeding up the development of the hardness of a binder. In particular, calcined lime is suitable as an addition for speeding up the curing of molasses-based binders.

Particularly advantageously, the agglomerates have according to the invention a diameter of 0.5 to 8 mm, in particular 3 to 6 mm. In this respect, it is possible to adapt the diameter of the agglomerates to the conditions in the metallurgical process. For example, the diameter may be chosen in dependence on the conditions in a fluidized bed in a metallurgical process.

According to a special refinement of the process according to the invention, inorganic substances or mixtures thereof, in particular calcined or slaked lime or bentonite, are used as binders. These binders can withstand high temperatures and hot oxidizing or reducing gases, so that particularly stable agglomerates are formed.

According to a further special refinement of the process according to the invention, organic substances or mixtures thereof, in particular molasses, products from spent liquors of pulp production, starches or else cellulose-based long-chain polyelectrolytes, are used as binders. This allows particularly high strengths of the agglomerates to be achieved before and during the metallurgical process.

A further advantageous refinement of the process provides that the iron carriers are separated by classification into a fraction in the form of fine particles and one or more coarse fractions and the fraction in the form of fine particles is passed on to an agglomerating operation, possibly after drying, the classification taking place in the form of sifting or a combination of sifting and screening. If required, the classification may be preceded by a drying operation.

According to a special refinement of the process according to the invention, the one or more coarse fractions are comminuted, in particular finely ground, possibly after drying, and are passed on to an agglomerating operation. This also allows coarser fractions to be processed into agglomerates.

The object according to the invention is also achieved by the process according to the invention.

In a process for producing liquid pig iron or liquid primary steel products from charge materials, in particular iron ores, possibly additions and the agglomerates according to the invention, the charge materials are subjected to a substantial reduction in a reducing zone and then fed to a smelting zone or a smelting unit, in particular a melt gasifier, for smelting with the addition of carbon carriers and oxygen-containing gas to form a fixed bed. A process gas is in this case formed and introduced into the reducing zone. Also provided in addition to the reducing zone is a preheating zone, into which the charge materials and/or agglomerates are introduced, the temperature of the preheating zone and/or of the reducing zone being chosen such that the agglomerates completely harden in the preheating zone or alternatively in the reducing zone. Alternatively, the agglomerates may also be introduced into the smelting zone.

In this case, the preheating zone, the reducing zone and the smelting zone may be formed by a blast furnace. Furthermore, they may also be formed by separate units, comprising reducing units and one or more smelting units, such as for example a melt gasifier, featuring a common preheating zone or a number of preheating zones assigned to individual reducing units or smelting units. Suitable processes for using the agglomerates according to the invention are direct reduction processes, smelting-reduction processes, such as COREX® or FINEX®, or else use in a blast furnace.

This transfers the hardening of the agglomerates at least partly into the process, so it is therefore carried out in the preheating zone. Previously necessary heat treatments of the agglomerates can be greatly curtailed or carried out at lower temperatures. Moreover, problems such as outgassings from the agglomerates during hardening are considerably reduced as a result, so that it is also possible to a great extent to do away with complex treatments of gaseous substances or vapors that escape from the agglomerates.

According to the invention, the proportion of the agglomerates in the charge materials is at least 30%. However, it is also conceivable that the proportion may be significantly increased up to almost 100%, so that the processing of very fine charge materials in large quantities is also possible. By contrast with the prior art, where only small proportions of fine charge materials can be processed, the operating range or the range of processable grain sizes is increased significantly by the process according to the invention. This makes a much more flexible process possible, since the charge materials can now be chosen according to requirements and according to available raw materials or raw material prices.

A special refinement of the process according to the invention provides that the reducing zone has at least one, in particular 2 to 4, reducing stages. In addition, a preheating zone may also be provided. The use of a number of reducing zones has been found to be advantageous. The reducing zones may be formed by reducing units in which the material to be reduced is conducted in counter flow to the reducing gas. The reducing gas is formed in the smelting zone or the smelting unit and conducted through the reducing units.

A further special refinement of the process according to the invention provides that at least two reducing zones arranged in parallel with a common preheating zone or each with its own preheating zone are provided. The use of two reducing zones arranged in parallel allows the reduction capacity to be increased or adapted as required. According to the invention, the charge materials are dried before loading into the preheating zone.

The drying is possibly followed by hardening of the agglomerates, the temperature lying above the drying temperature. In particular, if molasses are used as binders, a caramelization may be carried out, preferably above 250° C. The sensible heat taken up during the drying and possible hardening of the agglomerates is preferably fed to the preheating zone with the agglomerates, avoiding cooling losses.

According to a particular refinement of the process according to the invention, to set the temperature in the preheating zone, a partial combustion of the process gas takes place in the preheating zone.

According to a further refinement of the process according to the invention, to set the temperature in the preheating zone, an at least partial combustion of a combustion gas introduced into the preheating zone takes place or a hot gas is introduced into the preheating zone.

The measures described allow the temperature of the preheating zone to be specifically set.

A particular refinement of the process provides that the charge materials are first classified into a fraction in the form of fine particles and a coarse fraction or a number of coarse fractions, the coarse fraction or the coarse fractions being introduced directly into the reducing zone, possibly after drying and/or comminution, and the fraction in the form of fine particles being introduced into the reducing zone after passing through an agglomeration process. Alternatively or in addition, coarse fractions or part of the coarse fractions may also be introduced directly into the smelting zone. This allows the agglomeration effort to be reduced, since only the fraction in the form of fine particles has to be passed on to an agglomerating operation. A comminution takes place if particles are of such a size that they cannot be processed.

According to the invention, the one or more coarse fractions are comminuted, in particular finely ground, possibly after drying, and introduced into the reducing zone after passing through an agglomeration process. This also allows coarse fractions to be processed as agglomerates and introduced into the reducing zone.

According to an advantageous refinement of the process according to the invention, before an agglomerating operation according to the invention, the charge materials pass through a sorting operation, a fraction that is enriched with substances of value and/or depleted of harmful substances being formed and this fraction being fed to the reducing zone as agglomerates. The classification alone allows enrichment of substances of value and depletion of harmful substances, so that the reduction process can be operated more efficiently and harmful substances can be separated out in advance.

According to a special refinement of the process according to the invention, the sorting is carried out by making use of different densities, particle sizes and particle forms, surface properties, magnetic properties and the electrical conductivity of individual contents of charge materials, in particular by means of a hydrocyclone, jigging machine, vibrating table, dense medium, flotation, magnetic separation or electrostatic separation. With such processes, ore concentrates can be produced.

An advantageous refinement of the process provides that the classification takes place on the basis of a single- or multi-stage sifting operation in the case of dry charge materials and on the basis of a wet sifting operation in the case of moist charge materials. Consequently, moist charge materials can also be processed without any problem.

According to an advantageous refinement of the process according to the invention, the moist charge materials are mechanically and/or thermally dried before their agglomeration.

BRIEF DESCRIPTION OF THE DRAWING

The invention is described further by way of example with reference to a non-restrictive exemplary embodiment or FIG. 1.

FIG. 1: shows an installation for carrying out the processes according to the invention

DESCRIPTION OF A PREFERRED EMBODIMENT

FIG. 1 shows a smelting unit 1, which forms a smelting zone. The smelting unit may be formed as a melt gasifier, but also may be configured as a shaft furnace or as a liquid bath furnace. The reducing gas formed in the smelting unit 1 is introduced into the reducing units R1-R4 and conducted in counter flow to the charge materials that are to be reduced. The devices for treating the reducing gas that are represented in the FIGURE are not discussed in any more detail at this point.

Fine-grained iron carriers 2, such as for example iron ores and/or iron-containing dust and/or slurries, are mixed together with additions 3 and a binder 4, possibly kneaded and agglomerated in a mixing and agglomerating device 5, in particular granulated. Thereafter, this mixture is fed to a device 6 for hardening, in which curing of the binder occurs by heating, so that there is an increase in the strength in the agglomerates. In this case, the heating and the dwell time of the agglomerates in the device 6 are controlled in such a way that only the binder in the region of the outer layer of the agglomerates cures. The mixing and agglomerating device 5 may also be of a multi-stage form, so that the agglomerates produced can be coated with one or more layers. This allows agglomerates that have a layer-like structure to be produced, it being possible for each layer to differ with respect to composition and binder. It is advantageous to choose a binder that has a low curing temperature or curing time for the outermost layer, so that the hardening in the device 6 can take place at lower temperatures and for lower hardening times.

After the treatment in the device 6, the agglomerates may, if required, also be dried in the drying device 7 and the moisture content can be specifically set. Thereafter, the agglomerates are fed to a reducing unit R4, which can be operated as a preheating unit. The sensible heat contained in the agglomerates as a result of drying is in this case preferably introduced into the reducing unit.

In the preheating unit, hardening of the agglomerates also takes place in their interior on account of the high temperatures of 400 to 900° C., so that a high strength that is advantageous for the further process can be set. A final hardening of the agglomerates may also take place in the reducing zone.

Such agglomerates can be passed on not only to reduction processes, smelting-reduction processes and the blast furnace process but also to any desired metallurgical process that processes agglomerates. The agglomerates reduced in the reducing units R1-R4 are advantageously fed to a further agglomerating device 8, so that in turn agglomerates can be introduced into the smelting unit 1. In this way, the handling of the charge materials for the smelting unit, that is their transport, conveyance or storage, can be improved.

The invention claimed is:

1. A process for producing agglomerates from materials, comprised of fine-grained iron carriers, including materials selected from the group consisting of iron ores, iron ore concentrates, iron-containing dusts, and iron ore containing slurries, additions, and at least one binder, the agglomerates being used as a charge material for a thermal metallurgical process, the process comprising
   in an agglomeration step, mixing the iron carriers with a first binder and the additions and forming agglomerates with an interior;
   in at least one further agglomeration step, coating the agglomerates with an outer layer comprising iron carriers and at least one second binder, and
   heating the agglomerates so that only the at least one second binder in the outer layer of the agglomerates cures, wherein the at least one second binder has a lower curing temperature than the first binder in the interior of the agglomerates.

2. The process as claimed in claim 1, further comprising hardening the agglomerates before the at least one further agglomeration step.

3. The process as claimed in claim 2, further comprising, after the hardening of the agglomerates, coating the agglomerates with a coating of carbon-containing materials, lime, calcined lime, or dusts from the agglomeration step.

4. The process as claimed in claim 1, further comprising, before the agglomeration step, kneading the iron carriers, the first binder, and the additions to improve a binding ability thereof.

5. The process as claimed in claim 1, wherein the iron carriers further comprise granular fractions of iron ores, the granular fractions being comprised of recycled agglomerates having a grain size of 0.1 to 3 mm, such that the granular fractions serve as nucleants for forming of the agglomerates.

6. The process as claimed in claim 1, further comprising, during or after the agglomeration step, drying the agglomerates by methods selected from the group consisting of thermal drying and storing in air.

7. The process as claimed in claim 1, further comprising mechanically dewatering the agglomerates before or during the agglomeration.

8. The process as claimed in claim 7, wherein the dewatering comprises mechanical dewatering performed during a press forming operation.

9. The process as claimed in claim 1, further comprising granulating or pelletizing the agglomerates.

10. The process as claimed in claim 1, wherein the dusts and slurries include materials selected from the group consisting of iron-containing remains from steel production, carbon-containing remains from steel production, finely ground carbon carriers, anthracite, coke, and petroleum coke.

11. The process as claimed in claim 1, wherein the iron carriers are sintered ore, ore concentrate, undersized material of iron ore, returns or dusts from the agglomeration step.

12. The process as claimed in claim 1, wherein the additions are selected from the group consisting of metallurgical additions, lime, dolomite, and carbon-containing additions, the additions producing at least partially self-reducing agglomerates.

13. The process as claimed in claim 1, wherein the agglomerates have a diameter of 0.5 to 8 mm.

14. The process as claimed in claim 1, wherein the first and second binders comprise inorganic substances comprising calcined or slaked lime or bentonite or mixtures of the inorganic substances.

15. The process as claimed in claim 1, wherein the first and second binders comprise organic substances comprising molasses, products from spent liquors of pulp production, starches or cellulose-based long-chain polyelectrolytes or mixtures of the organic substances.

16. The process as claimed in claim 1, further comprising separating the iron carriers by classification into a fraction in the form of fine particles and one or more coarse fractions, passing the fraction in the form of fine particles to the agglomeration step, the classification comprising sifting or a combination of sifting and screening.

17. The process as claimed in claim 16, further comprising comminuting the one or more coarse fractions and passing the fractions on to the agglomeration step.

18. The process as claimed in claim 17, further comprising, prior to the comminuting of the coarse fractions, drying the coarse fractions.

19. A process for producing liquid pig iron or liquid primary steel products from charge materials, including iron ores and agglomerates produced according to the process for producing agglomerates as claimed in claim 1, the process comprising
   substantially reducing the charge materials in a reducing zone and then feeding the charge materials to a smelting zone or a smelting unit in the form of a melt gasifier for smelting and adding carbon carriers and oxygen-containing gas to form a fixed bed and forming a process gas,
   selecting steps from the group consisting of introducing the process gas into the reducing zone, and introducing the charge materials or agglomerates into a preheating zone, and
   selecting the temperature of zones selected from the group consisting of the preheating zone and the reducing zone such that the agglomerates completely harden in the preheating zone or in the reducing zone.

20. The process as claimed in claim 19, wherein a proportion of the agglomerates in the charge materials is at least 30%.

21. The process as claimed in claim 19, wherein the reducing zone has at least one reducing stage.

22. The process as claimed in claim 19, further comprising drying the charge materials before loading into the preheating zone.

23. The process as claimed in claim 19, further comprising setting the temperature in the preheating zone by at least partially combusting a combustion gas introduced into the preheating zone or introducing a hot gas into the preheating zone.

24. The process as claimed in claim 19, further comprising first classifying the charge materials into a fraction in the form of fine particles and one or more coarse fractions, introducing the one or more coarse fractions directly into the reducing zone, and introducing the fraction in the form of fine particles into the reducing zone after passing it through the process for producing agglomerates.

25. The process as claimed in claim 19, further comprising comminuting the one or more coarse fractions by fine grinding, and introducing the ground fractions into the reducing zone after passing the ground fractions through the process for producing agglomerates.

26. The process as claimed in claim 24, wherein the classification takes place on the basis of a single- or multi-stage sifting operation in the case of dry charge materials and on the basis of a wet sifting operation in the case of moist charge materials.

27. The process as claimed in claim 26, further comprising selecting steps from the group consisting of mechanically drying the moist charge materials and thermally drying the moist charge materials before the moist charge materials undergo the process for producing agglomerates.

28. The process as claimed in claim 19, further comprising, before the process for producing agglomerates, passing materials through a sorting operation, selecting a step from the group consisting of enriching a fraction with substances of value and depleting the fraction of harmful substances and feeding the fraction to the reducing zone as agglomerates after the fraction undergoes the process for producing agglomerates.

29. The process as claimed in claim 28, wherein the sorting makes use of properties of the materials selected from the group consisting of densities, particle sizes and particle forms, surface properties, magnetic properties and the electrical conductivity of individual contents of the materials, and the sorting is by means of methods or devices selected from the group consisting of a hydrocyclone, a jigging machine, a vibrating table, a dense medium, flotation, magnetic separation, or electrostatic separation.

30. The process as claimed in claim 1, wherein the iron carriers comprise materials selected from the group consisting of fine-grained iron ores, dusts, and slurries thereof in granular fractions of recycled agglomerates having a grain size of 0.5 to 1.5 mm, such that the granular fractions serve as nucleants for forming the agglomerates.

31. A process for producing liquid pig iron or liquid primary steel products from charge materials, including iron ores and agglomerates produced according to a process for producing agglomerates from materials, comprised of fine-grained iron carriers, including materials selected from the group consisting of iron ores, iron ore concentrates, iron-containing dusts, and iron ore containing slurries, additions, and at least one binder, the agglomerates being used as a charge material for a thermal metallurgical process, the process for producing agglomerates comprising in an agglomeration step, mixing the iron carriers with a first binder and the additions and forming agglomerates with an interior;

in at least one further agglomeration step, coating the agglomerates with an outer layer comprising iron carriers and at least one second binder, and heating the agglomerates so that only the at least one second binder in the outer layer of the agglomerates cures, wherein the at least one second binder has a lower curing temperature than the first binder in the interior of the agglomerates, the process for producing liquid pig iron or liquid primary steel products comprising substantially reducing the charge materials in a reducing zone and then feeding the charge materials to a smelting zone or a smelting unit in the form of a melt gasifier for smelting and adding carbon carriers and oxygen-containing gas to form a fixed bed and forming a process gas, selecting steps from the group consisting of introducing the process gas into the reducing zone, and introducing the charge materials or agglomerates into a preheating zone, and selecting a temperature of at least one of the zones selected from the group consisting of the preheating zone and the reducing zone such that the agglomerates completely harden in the preheating zone or in the reducing zone, wherein the reducing zone has at least one reducing stage, and wherein the at least one reducing stage comprises at least two reducing stages, at least two of the reducing stages being arranged in parallel with a common preheating zone or each reducing zone having its own preheating zone.

32. A process for producing liquid pig iron or liquid primary steel products from charge materials, including iron ores and agglomerates produced according to a process for producing agglomerates from materials, comprised of fine-grained iron carriers, including materials selected from the group consisting of iron ores, iron ore concentrates, iron-containing dusts, and iron ore containing slurries, additions, and at least one binder, the agglomerates being used as a charge material for a thermal metallurgical process, the process for producing agglomerates comprising in an agglomeration step, mixing the iron carriers with a first binder and the additions and forming agglomerates with an interior;

in at least one further agglomeration step, coating the agglomerates with an outer layer comprising iron carriers and at least one second binder, and heating the agglomerates so that only the at least one second binder in the outer layer of the agglomerates cures, wherein the at least one second binder has a lower curing temperature than the first binder in the interior of the agglomerates, the process for producing liquid pig iron or liquid primary steel products comprising substantially reducing the charge materials in a reducing zone and then feeding the charge materials to a smelting zone or a smelting unit in the form of a melt gasifier for smelting and adding carbon carriers and oxygen-containing gas to form a fixed bed and forming a process gas, selecting steps from the group consisting of introducing the process gas into the reducing zone, and introducing the charge materials or agglomerates into a preheating zone, and selecting a temperature of at least one of the zones selected from the group consisting of the preheating zone and the reducing zone such that the agglomerates completely harden in the preheating zone or in the reducing zone, the process for producing liquid pig iron or liquid primary steel products further comprising setting the temperature in the preheating zone by partial combustion of the process gas in the preheating zone.

33. A process for producing liquid pig iron or liquid primary steel products from charge materials, including iron ores and agglomerates produced according to a process for producing agglomerates from materials, comprised of fine-grained iron carriers, including materials selected from the group consisting of iron ores, iron ore concentrates, iron-containing dusts, and iron ore containing slurries, additions, and at least one binder, the agglomerates being used as a charge material for a thermal metallurgical process, the process for producing agglomerates comprising in an agglomeration step, mixing the iron carriers with a first binder and the additions and forming agglomerates with an interior;

in at least one further agglomeration step, coating the agglomerates with an outer layer comprising iron carriers and at least one second binder, and heating the agglomerates so that only the at least one second binder in the outer layer of the agglomerates cures, wherein the at least one second binder has a lower curing temperature than the first binder in the interior of the agglomerates, the process for producing liquid pig iron or liquid primary steel products comprising substantially reducing the charge materials in a reducing zone and then feeding the charge materials to a smelting zone or a smelting unit in the form of a melt gasifier for smelting and adding carbon carriers and oxygen-containing gas to form a fixed bed and forming a process gas, selecting steps from the group consisting of introducing the process gas into the reducing zone, and introducing the charge materials or agglomerates into a preheating zone, and selecting a temperature of at least one of the zones selected from the group consisting of the preheating zone and the reducing zone such that the agglomerates completely harden in the preheating zone or in the reducing zone, wherein the reducing zone has at least one reducing stage, and wherein the preheating zone is separated from the reducing stage or stages in such a way that a gas flow between the stages is avoided to the greatest extent.

* * * * *

UNITED STATES PATENT AND TRADEMARK OFFICE
CERTIFICATE OF CORRECTION

PATENT NO.        : 8,641,799 B2                                                      Page 1 of 1
APPLICATION NO. : 13/063344
DATED             : February 4, 2014
INVENTOR(S)       : Boehm et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this
Twenty-second Day of September, 2015

Michelle K. Lee
*Director of the United States Patent and Trademark Office*